United States Patent
Arkko et al.

(10) Patent No.: US 9,576,572 B2
(45) Date of Patent: Feb. 21, 2017

(54) METHODS AND NODES FOR ENABLING AND PRODUCING INPUT TO AN APPLICATION

(75) Inventors: Jari Arkko, Kauniainen (FI); Jouni Mäenpää, Nummela (FI); Tomas Mecklin, Kyrkslätt (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 86 days.

(21) Appl. No.: 14/408,756

(22) PCT Filed: Jun. 18, 2012

(86) PCT No.: PCT/SE2012/050672
§ 371 (c)(1),
(2), (4) Date: Dec. 17, 2014

(87) PCT Pub. No.: WO2013/191599
PCT Pub. Date: Dec. 27, 2013

(65) Prior Publication Data
US 2015/0199961 A1    Jul. 16, 2015

(51) Int. Cl.
*G10L 15/00* (2013.01)
*G10L 15/08* (2006.01)
(Continued)

(52) U.S. Cl.
CPC ............ *G10L 15/08* (2013.01); *G06F 3/167* (2013.01); *G10L 15/22* (2013.01); *G10L 15/30* (2013.01);
(Continued)

(58) Field of Classification Search
CPC ........ G10L 15/26; G10L 15/265; H04M 1/253
(Continued)

(56) References Cited

U.S. PATENT DOCUMENTS 6,073,097 A * 6/2000 Gould ................. G09B 19/04
                                                    704/240
6,125,347 A * 9/2000 Cote .................... G10L 15/26
                                                    704/270
(Continued)

FOREIGN PATENT DOCUMENTS

DE    102008025532 A1    12/2009
EP        1104155 A2      5/2001
(Continued)

OTHER PUBLICATIONS

Supplementary European Search Report issued on Jun. 30, 2015, in corresponding European Patent application No. 12879477.3, 8 pages.

*Primary Examiner* — Daniel Abebe
(74) *Attorney, Agent, or Firm* — Patent Portfolio Builders, PLLC (57) ABSTRACT

Methods and nodes for enabling and producing input generated by speech of a user, to an application. When the application has been activated (2:1), an application node (200) detects (2:2) a current context of the user and selects (2:3), from a set of predefined contexts (204a), a predefined context that matches the detected current context. The application node (200) then provides (2:4) keywords associated with the selected predefined context to a speech recognition node (202). When receiving (2:5) speech from the user, the speech recognition node (202) is able to recognize (2:6) any of the keyword in the speech. The recognized keyword is then used (2:7) as input to the application.

16 Claims, 4 Drawing Sheets

(51) Int. Cl.
*G10L 15/22* (2006.01)
*G06F 3/16* (2006.01)
*G10L 15/30* (2013.01)

(52) U.S. Cl.
CPC .... *G10L 2015/088* (2013.01); *G10L 2015/228* (2013.01)

(58) Field of Classification Search
USPC ........................................................ 704/275
See application file for complete search history.

(56) References Cited

U.S. PATENT DOCUMENTS

| | | | |
|---|---|---|---|
| 7,225,127 B2* | 5/2007 | Lucke | G10L 15/1815 704/10 |
| 7,899,673 B2* | 3/2011 | Brown | 704/10 |
| 9,081,868 B2* | 7/2015 | Zhang | G06F 17/30654 |
| 2001/0056346 A1 | 12/2001 | Ueyama et al. | |
| 2002/0133354 A1* | 9/2002 | Ross | G10L 15/30 704/275 |
| 2003/0009335 A1 | 1/2003 | Schalkwyk et al. | |
| 2004/0054539 A1 | 3/2004 | Simpson | |
| 2006/0074892 A1* | 4/2006 | Davallou | G06F 17/3061 |
| 2007/0213984 A1 | 9/2007 | Ativanichayaphong et al. | |
| 2008/0046250 A1 | 2/2008 | Agapi et al. | |
| 2009/0228281 A1 | 9/2009 | Singleton et al. | |
| 2010/0088100 A1* | 4/2010 | Lindahl | G10L 15/30 704/270.1 |
| 2011/0067059 A1* | 3/2011 | Johnston | G10L 15/30 725/39 |
| 2011/0313776 A1* | 12/2011 | Alfred | H04L 12/2818 704/275 |
| 2012/0278078 A1* | 11/2012 | Ricci | G10L 15/22 704/251 |
| 2013/0218563 A1* | 8/2013 | Basir | G10L 15/02 704/254 |
| 2014/0229174 A1* | 8/2014 | Graumann | G10L 15/22 704/231 |
| 2014/0244259 A1* | 8/2014 | Rosario | G10L 15/08 704/254 |
| 2015/0127353 A1* | 5/2015 | Cho | G06F 3/167 704/275 |

FOREIGN PATENT DOCUMENTS

| | | |
|---|---|---|
| EP | 2045798 A1 | 4/2009 |
| WO | 2009143904 A1 | 12/2009 |
| WO | 2011151502 A1 | 12/2011 |

* cited by examiner

METHODS AND NODES FOR ENABLING AND PRODUCING INPUT TO AN APPLICATION

CROSS REFERENCE TO RELATED APPLICATION(S)

This application is a 35 U.S.C. § 371 National Phase Entry Application from PCT/SE2012/050672 Jun. 18, 2012, the disclosure of which is incorporated by reference.

TECHNICAL FIELD

The present disclosure relates generally to methods and an application node and a speech recognition node for enabling and producing speech generated input to an application in a communication network.

BACKGROUND

In the field of telecommunication, speech recognition is sometimes employed in various communication services, meaning that a user is able to speak voice commands into a User Equipment, UE, for controlling some functionality therein or in a communication network, rather than entering written commands and pressing buttons on a keyboard or the like. In some applications, a speech recognition function in the UE or in the network is able to translate the entered voice command into a text such as a recognizable message or just a single word. A spoken voice command in the UE may also be sent in digitally encoded form to a speech recognition entity where the actual speech recognition is executed by analyzing and translating the speech into corresponding text. Recently, speech recognition has been applied for smart phones e.g. the speech-based service called "Siri" developed for Apple iPhones.

Figure 1:
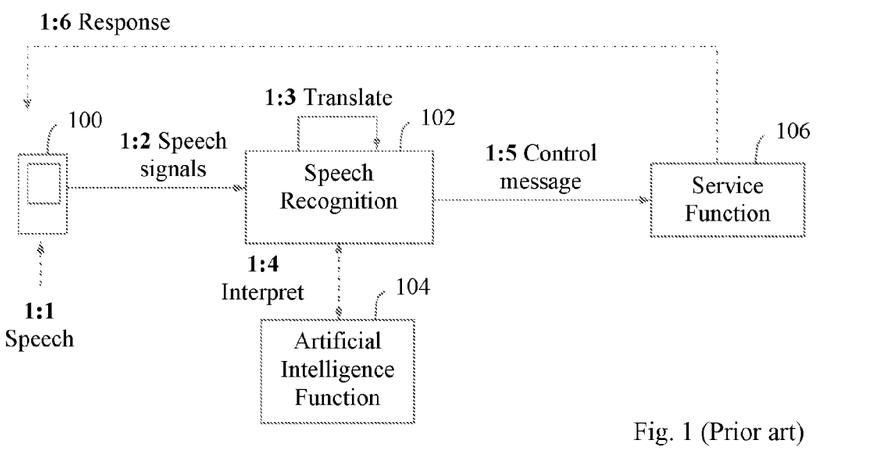
FIG. 1 is a communication scenario illustrating a conventional example of using speech recognition, according to the prior art.

FIG. 1 illustrates an example of how conventional speech recognition can be used in a communication network for controlling some service function or apparatus which could be any voice-controllable device or function such as, e.g., a teleconference bridge, a banking service, an electronic game, functions in a telephone or computer, control of various home appliances, and so forth. Thus, when a spoken command is entered in a UE 100, shown as an action 1:1, the UE 100 provides a digitized version of the speech as signals to a speech recognition entity 102, shown as another action 1:2. The speech recognition entity 102 then translates the received speech signals into a text version of the speech, in an action 1:3. As said above, the speech recognition entity 102 may be implemented in the network or in the UE 100 itself.

Possibly, the entity 102 may also utilize a function referred to as "Artificial Intelligence", AI, 104 to make a more or less elaborated interpretation of the spoken command, as shown by a schematic action 1:4. In that case, the AI function 104 basically deduces the meaning of a spoken question or command once it has been converted to text by the speech recognition 102. As a result, the speech recognition entity 102 may issue a control message or command corresponding to the entered speech, as shown in an action 1:5, which somehow controls or otherwise interacts with a service function or apparatus 106. The service function or apparatus 106 may then process the control message and operate accordingly such as providing a suitable response back to the UE 100, as shown by a final action 1:6.

In general, the speech recognition services known today include two parts, the actual speech recognition and the interpretation thereof e.g. by means of an AI function or the like. In different typical implementations, both of these parts may reside in the UE or partly or completely in nodes of the network. In the above-mentioned service Siri for iPhones, a simplified speech analysis and AI analysis is made by the phone, which in parallel may send the speech in text form to an AI function in the network for obtaining a more advanced analysis and creation of a suitable response or other action.

Voice-controlled applications are configured to operate according to different received speech input as commands or queries, e.g. an electronic game application implemented in a game server in the network which may receive various spoken lines from game participants for controlling the ongoing game. One or more words in a received speech input are typically significant for the command or query and are therefore often called "keywords" in this field. The one or more keywords in a received speech input must therefore be recognized such that the application is able to act and operate upon the speech input in a proper manner. To support this process, some kind of automatic speech analysis of the speech input needs to be made.

Computer implemented speech analysis may be executed according to some different techniques. A first example is generally referred to as "speech recognition" where all speech received in audio form is translated, word by word, into a text version of the entire speech input, thus comprising a chain of words. It is then easy for a computer to identify any keywords occurring in the text.

A second example is referred to as "keyword spotting" which does not require translation of the entire speech input into text but the audio is searched only for specific words or phrases by recognizing their sound, more or less, and then translating them into text. In general, keyword spotting requires less computing than speech recognition since only a limited word or phrase must be recognized for translation instead of an entire vocabulary.

A third example is referred to as "phonetic-based search" which is similar to keyword spotting in that only certain words are searched and identified in the speech input, although it does not require converting the speech input into text. In phonetic-based search, the process is divided into separate indexing and searching stages. In the indexing stage, the speech input is indexed to produce a phonetic search track which is a phonetic representation of the speech rather than words in text form. Once the indexing has been completed, the searching stage includes searching for a keyword in the form of phoneme, i.e. sound-based, sequences in the phonetic search track.

Even though certain significant keywords can be recognized and identified in a received speech input, e.g. using any of the above techniques, some applications may need to act and operate upon received keywords in different ways depending on the current situation. For example, a command may need certain actions when coming from one user and other actions when coming from another user. Further, some keywords may be significant for the application to act upon in one situation while other keywords may be significant for the application in another situation. It is thus a problem in currently known solutions that the use of keywords in speech input for controlling applications is somewhat static or inflexible and not adaptable to different situations.

SUMMARY

It is an object of embodiments described herein to address at least some of the problems and issues outlined above. It is possible to achieve these objects and others by using methods and nodes as defined in the attached independent claims.

According to one aspect, a method is provided in an application node for enabling input to an application from speech made by a user. In this method, the application node detects a current context of the user when the application has been activated, and selects a predefined context that matches the detected current context. The application node then provides at least one keyword associated with the selected predefined context to a speech recognition node, thereby enabling the speech recognition node to recognize any of the at least one keyword in the speech when made by the user. The recognized keyword is used as input to the application, i.e. as a result of receiving the speech.

Thereby, speech recognition can be employed in a flexible and efficient way by adapting the choice of valid keywords for use as input to an application in dependence of the current context of the user. It is also an advantage that the solution thus enables dynamic use of keywords in speech input for controlling applications, which is adaptable to different situations.

According to another aspect, an application node is provided which is configured to enable input from speech made by a user to an application. The application node comprises a detecting unit adapted to detect a current context of the user when the application has been activated, and a selecting unit adapted to select a predefined context that matches the detected current context. The application node also comprises a providing unit adapted to provide at least one keyword associated with the selected predefined context to a speech recognition node, thereby enabling the speech recognition node to recognize any of the at least one keyword in the speech, wherein the recognized keyword is used as input to the application.

According to another aspect, a method is provided in a speech recognition node for producing input to an application from speech made by a user. In this method, the speech recognition node receives from an application node at least one keyword associated with a predefined context that matches a current context of the user. When receiving the speech made by the user, the speech recognition node recognizes in the received speech a keyword out of the received at least one keyword, and uses the recognized keyword as input to the application.

According to another aspect, a speech recognition node is provided which is configured to produce input to an application from speech made by a user. The speech recognition node comprises a first receiving unit adapted to receive from an application node at least one keyword associated with a predefined context that matches a current context of the user. The speech recognition node also comprises a second receiving unit adapted to receive the speech made by the user, a logic unit adapted to recognize in the received speech a keyword out of the received at least one keyword, and a usage unit adapted to use the recognized keyword as input to the application.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided for making the use of speech from a user as input to an application more flexible and adaptable to different situations by enabling recognition of keywords in the speech depending on the current context of the user. In this solution, one or more predefined contexts and associated keywords have been configured in an application node for an application, such that each predefined context is associated with a certain set of keywords which thus may, at least partly, vary between different contexts. When a current context of the user is detected, which context is characterized by certain context parameters, a predefined context is selected having context parameters that best matches the detected context, and the keywords that are associated with the selected context are then valid as input to the application. Thus, when any of the keywords of the selected context is recognized in speech from the user, it is used as input to the application. For example, when recognized in speech from the user, the keywords of the selected context may be used as commands, information or other input for controlling the application in some way.

The solution will now be explained further with reference to an example shown in the block diagram of FIG. 2 which illustrates how an application can be controlled by means of speech made by a user. This scenario involves an application node 200 in which a set of predefined contexts 204a and associated keywords have been configured for the application, such that one or more specific keywords are valid for each predefined context. This means basically that those keywords are valid and useful as input to the application whenever the context of those keywords has been detected to prevail for the user. Any number of such predefined contexts 204a and associated keywords may have been configured in the application node 200 for one or more applications, including e.g. just a single context with one or more keywords valid for an application.

As indicated above, each context can be described or defined in terms of context parameters. To mention some non-limiting examples of context parameters in the predefined contexts, a context may pertain to a current location of the user such as geographical location, urban or rural, indoor or outdoor, etc. A predefined context may further pertain to a current status of the user, characteristics of the user, or the identity or role of the user. For example in an electronic game application, the user's role in the game may dictate what keywords are valid or not as input to the application. Further, a certain identity or role or a current "high" status may authorize the user to control the game in a certain manner, such as add or remove game participants by means of certain keyword commands, which may not be possible when having another role or a "low" status. A predefined context may further pertain to any of: the language spoken by the user, the type or current status of the activated application, a current time, and a current environment of the user.

Figure 2:
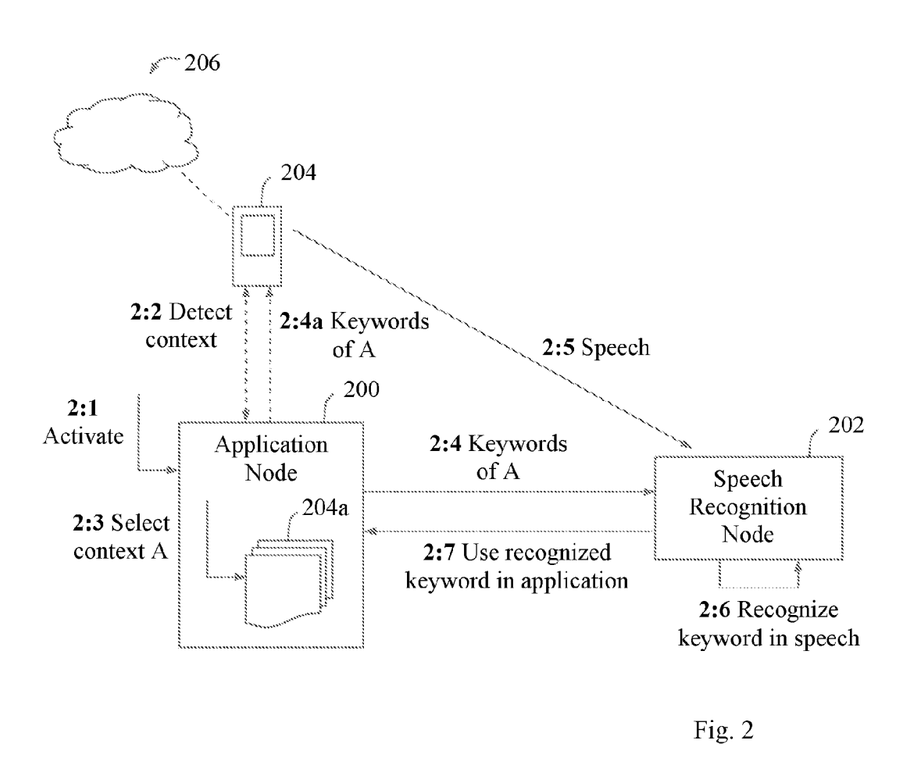
FIG. 2 is a block diagram illustrating a scenario where speech input to an application is enabled and produced, according to some possible embodiments.
Figure 4:
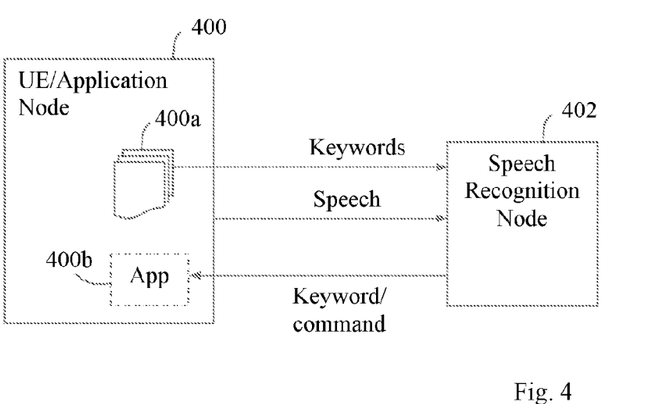
FIG. 4 is a block diagram illustrating a scenario where the solution is used for an application in a UE, according to further possible embodiments.

The scenario of FIG. 2 also involves a speech recognition node 202 which is utilized to recognize any of the valid keywords in speech made by the user into a UE 204 which is connected to a schematically shown communication network 206. The UE 204 operated by the user may, without limitation, be a telephone, computer, smartphone or any other communication device capable of sending speech in audio form, e.g. to the speech recognition node 202. In this description, the term "in audio form" should be understood such that the speech is represented as digitized audio, which is a well known technique. The application to be controlled by speech based input further resides in the application node 200 in this example, although it may alternatively or additionally reside in the UE 204 or in any other node, not shown, which may be responsive or susceptible to valid keywords in the speech. It is also possible that the application node 200 is integrated to coincide with the UE 204, of which an example is shown in FIG. 4 to be described later below.

A first action 2:1 in FIG. 2 illustrates that the application is activated, e.g. by manual input such as when the user presses a button or the like e.g. on a computer, game console, control panel, or similar. Activating the application may include registering or detecting the user as a controlling party, which means that the user is basically authorized to give input to the application. For example, the application may be configured to receive input from one or more specific users, or from any user without requiring authorization, depending on how the application has been designed.

In a next action 2:2, the application node 200 detects a current context of the user, schematically illustrated by a dashed arrow to the UE 204 of the user. For example, the current context of the user may be defined by any of the above-mentioned examples of context parameters that may be included in a predefined context. Context information about the user may be obtained from the UE 204 and/or from the network 206 and/or from various sensors associated with the user and his UE 204. Another action 2:3 illustrates that the application node 200 selects a predefined context, here denoted "A", out of the set of predefined contexts 204a, that matches or corresponds to the detected current context by having one or more of the above-described context parameters in common. This action may be performed by comparing the detected context with each predefined context 204a and determining how much of the context parameters they have in common. The predefined context that best matches the detected one is thus selected in this action.

The keywords that are associated with the selected predefined context A are then provided to the speech recognition node 202, in an action 2:4, as a basis for speech recognition of speech made by the user. The same set of keywords A may also be provided to the UE 204, shown by an optional action 2:4a. This enables the speech recognition node 202, and optionally also the UE 204, to recognize and identify any of the received keywords in speech made by the user, and any other words or phrases in the speech can basically be ignored, at least with regard to the application. This will facilitate the process of speech recognition in the node 202 and also make recognition of valid input to the application more accurate and effective.

Another action 2:5 illustrates that the speech recognition node 202 receives speech from the UE 204, which speech has been uttered by the user into the UE 204 e.g. when having activated a speech input function or the like. The speech recognition node 202 then recognizes in the received speech, in an action 2:6, at least one of the keywords that were received in action 2:4 above. The keyword may be recognized by using any of the above-described techniques of speech recognition, keyword spotting and phonetic-based search, although the solution is not limited to any particular procedure for recognizing specific words. More than one of the previously received keywords may be recognized in the speech in this action, although only one is mentioned and discussed here for simplicity.

A final action 3:7 illustrates that the speech recognition node 202 somehow "uses" the recognized keyword as input to the application, which may include that the recognized keyword is sent to at least one of the application in the node 200 and the UE 206. As mentioned above, the application may reside in one or more of the application node 200, the UE 206 and another node not shown here, which may thus be responsive or susceptible to valid keywords when recognized in the speech. The speech recognition node 202 may further translate the recognized keyword into a corresponding command used for controlling the application.

Figure 3A:
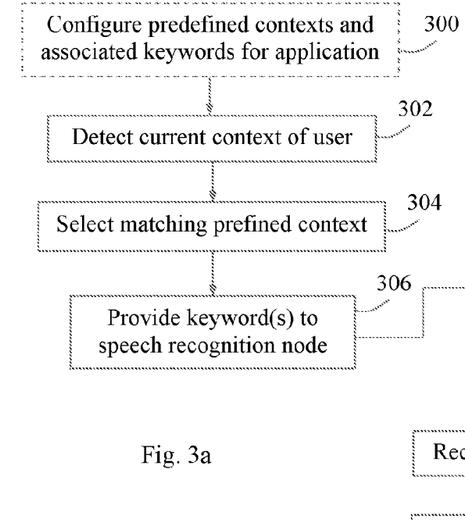
FIGS. 3a and 3b are flow charts illustrating procedures in an application node and a speech recognition node, respectively, according to further possible embodiments.
Figure 3B:
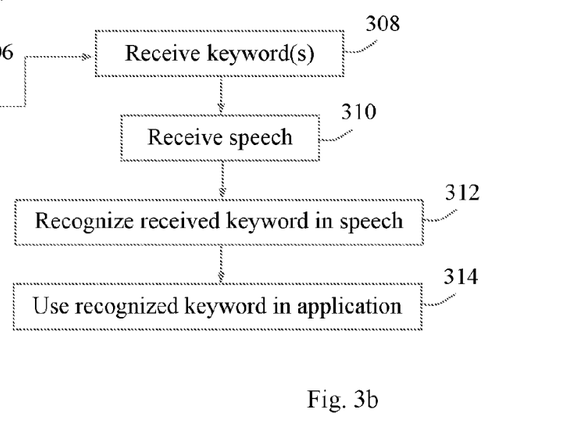

The flow chart of FIG. 3a comprises actions performed by an application node configured according to this solution, for enabling input to an application from speech made by a user. The application node may act basically as the application node 200 in FIG. 2. Further, the flow chart of FIG. 3b is basically a continuation of FIG. 3a and comprises actions performed by a speech recognition node configured according to this solution, for producing input to an application from speech made by a user. The speech recognition node may act basically as the speech recognition node 202 in FIG. 2. It is assumed that the application node is used to support the use of a speech controlled application which may be implemented in one or more of the application node itself, a UE operated by the user, and some other node than the above nodes. In a further example, the application node may be implemented as a part in the UE.

An optional first action 300 illustrates that a set of predefined contexts and associated keywords are configured in the application node for the application in preparation for the procedure to follow. This action may be performed in response to manual input from the user or an administrator of the application, depending on the implementation.

When the application has been activated in some way, the application node detects a current context of the user, in an action 302, basically corresponding to action 2:2 in FIG. 2. In a further action 304, the application node selects a predefined context that matches, i.e. corresponds to, the detected current context, basically corresponding to action 2:3 in FIG. 2. As described above, the detected current context may be compared with all predefined contexts configured in action 300 to determine which one of the latter best matches the current context, e.g. by comparing various context parameters in the predefined contexts with those of the current context and selecting the context having the most context parameters that match the current context. In another action 306, the application node provides at least one keyword associated with the selected predefined context to the speech recognition node, basically corresponding to action 2:4 in FIG. 2.

An action 308 on the speech recognition node side illustrates that this node receives the at least one keyword from the application node, which is/are thus valid as input to the application under the current context of the user. At some point later, the speech recognition node receives speech made by the user, e.g. from a UE operated by the user, as shown in an action 310, basically corresponding to action 2:5 in FIG. 2. The speech recognition node then recognizes in the received speech a keyword out of the received at least one keyword, in another action 312, basically corresponding to action 2:6 in FIG. 2. It should be noted that this action does not exclude that more than one keyword is recognized in the speech. The recognized keyword is thus valid and can be taken as input to the application under the detected current context of the user. Finally, the speech recognition node uses the recognized keyword as input to the application, in another action 314, basically corresponding to action 2:7 in FIG. 2, e.g. by sending the keyword as a command or other input to at least one of the application and the UE.

The above-described procedure may be modified in different ways such as outlined below. For example, the UE itself may have a speech recognition function that can be used to perform an initial "rudimentary" analysis which is sent to the speech recognition node which then makes a more advanced final determination of whether a valid keyword was present in the speech. To reduce computational cost, the rudimentary analysis carried out by the UE may include a speech recognition using a limited dictionary, or using a small-scale artificial neural network classifier or a light-weight version of any other algorithm used e.g. in the case of phonetic search.

In actions 306 and 308, the keywords are sent over a communication channel between the application node and the speech recognition node, This channel may be a special-purpose channel, e.g., a bi-directional Hyper Text Transfer Protocol HTTP, eXtensible Messaging and Presence Protocol XMPP, or Session Initiation Protocol SIP, which channel is used exclusively for exchanging the keywords. Alternatively, the keywords can be sent over a multi-purpose channel, e.g. a channel which is used for exchanging other information related to the application such as a game. If the UE and the speech recognition node use phonetic search, they need to translate the keywords from text into their phonetic representation for instance using a pronunciation dictionary.

FIG. 4 illustrates another possible example of implementing the solution where the above-described application node coincides with a UE 400 operated by a user. Further, a set of predefined contexts 400a has been configured in the UE/application node 400, and the application 400b itself is also implemented in the UE/application node 400 which could be any voice-controlled application. In this figure, it is schematically illustrated that keywords of a predefined context that matches a detected current context of the user, are sent from the UE/application node 400 to a speech recognition node 402. When receiving speech from the UE/application node 400, the speech recognition node 402 is able to recognize a keyword of the above matching predefined context in the speech and send the recognized keyword or a corresponding command as input to the application 400b in the UE/application node 400.

Figure 5:
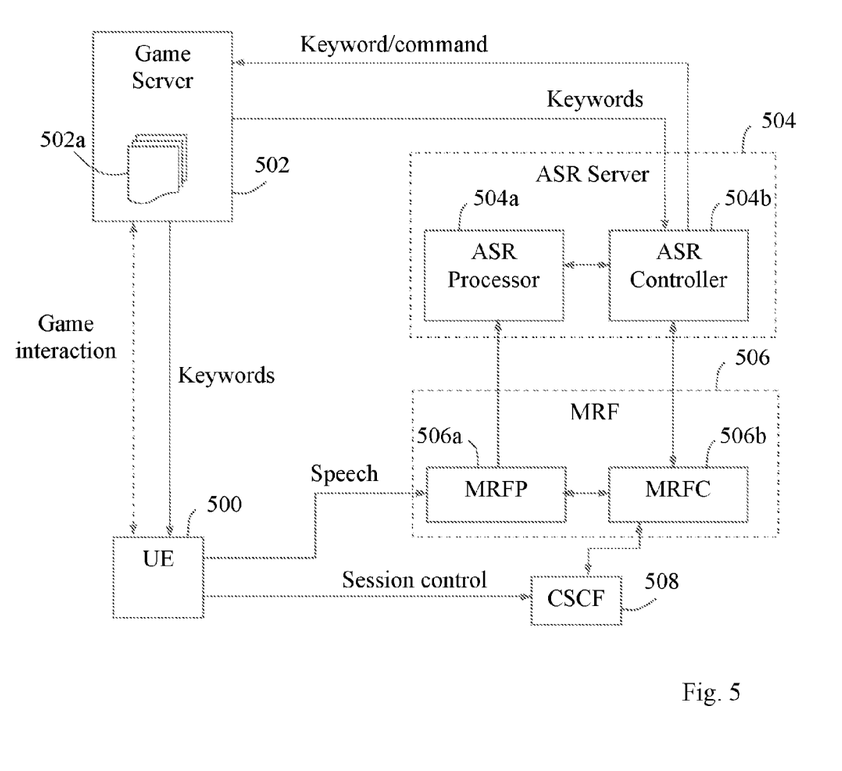
FIG. 5 is a block diagram illustrating an example of a procedure when the solution is used for a game application, according to further possible embodiments.

A more detailed example of implementing the solution in practice will now be described with reference to the block diagram in FIG. 5. In the figure, the user operates a UE 500 and an online gaming application is assumed. The online game is run on a game server 502 located in the public Internet, the server 502 thus effectively acting as the application node in this example. A set of predefined contexts 502a with associated keywords have been configured in the game server 502.

Further, an IP Multimedia Subsystem, IMS, network is used to control voice communication within the game by means of a Media Resource Function MRF 506 comprising an MRF Processor MRFP 506a and an MRF Controller MRFC 506b. The IMS network also provides an Automatic Speech Recognition ASR service for the game in the form of an ASR server 504 comprising an ASR processor 504a and an ASR controller 504b. The ASR controller 504b is a control plane node, whereas the ASR processor 504a is a media plane node. The ASR server 504 thus effectively acts as the speech recognition node in this example.

The example in FIG. 5 involves multiple interfaces that can be used for this solution as follows:

A) A game interface is used for exchanging data and information related to the game between the UE 500 and the game server 502.

B) The UE 500 uses a SIP-1 interface for session control related signalling towards the IMS through a Call Session Control Function CSCF server 508, which is a common node used as a point of contact with UEs.

C) A SIP-2 interface is used to exchange SIP signalling between the CSCF server 508 and the MRFC 506b.

D) The MRFC 506b uses an H.248-1 interface to control the MRFP 506a and the latter takes care of standard media related functionality such as audio mixing in the gaming session.

E) The MRFC 506b uses a SIP-3 interface to invite the ASR server 504 to the gaming session.

F) The ASR controller 504b controls the ASR processor 504a via an H.248-2 interface.

G) The ASR server 504 is thus invited to the media session so that it will receive a copy of speech in audio form, also referred to as an audio stream, that the user generates in the game. When the MRFP 506a receives the speech from the UE 500, an RTP-2 interface is used for forwarding the speech from the MRFP 506a to the ASR processor 504a which can thus apply speech recognition related processing of the speech.

H) A SIP-4 interface may be used as an optional interface to forward SIP signaling from the UE 500 via the CSCF 508 to the ASR controller 504b without having to send the signaling via the MRFC 506b.

I) An RTP-1 interface is used to carry the speech as an RTP audio stream from the UE 500 to the MRFP 506a. The RTP-2 interface is, as described in G) above, used to forward a copy of this stream to the ASR processor 504a.

J) A REST-1 interface is an HTTP interface between the UE 500 and the game server 502, where REST stands for Representation State Transfer. The game server 502 uses this interface to inform the UE 500 about valid keywords used in the game at a given moment, e.g. according to a detected context of the user as described above.

K) A REST-2 interface is an HTTP interface that is used by the game server 502 to inform the ASR controller 504b about keywords that can be used in the game at a given moment, e.g. according to a detected context of the user as described above.

L) A REST-3 interface is an optional HTTP interface between the UE 500 and the ASR controller 504b that may be used by the UE 500 to inform the ASR controller 504b about keywords to be used in the game.

This interface is optional since the keywords could be also sent to the ASR controller 504b over the IMS SIP interfaces.

It should be noted that the HTTP REST interfaces in the example above could also be interfaces using a different protocol, e.g., XMPP, SIP, or any other suitable protocol.

Figure 6:
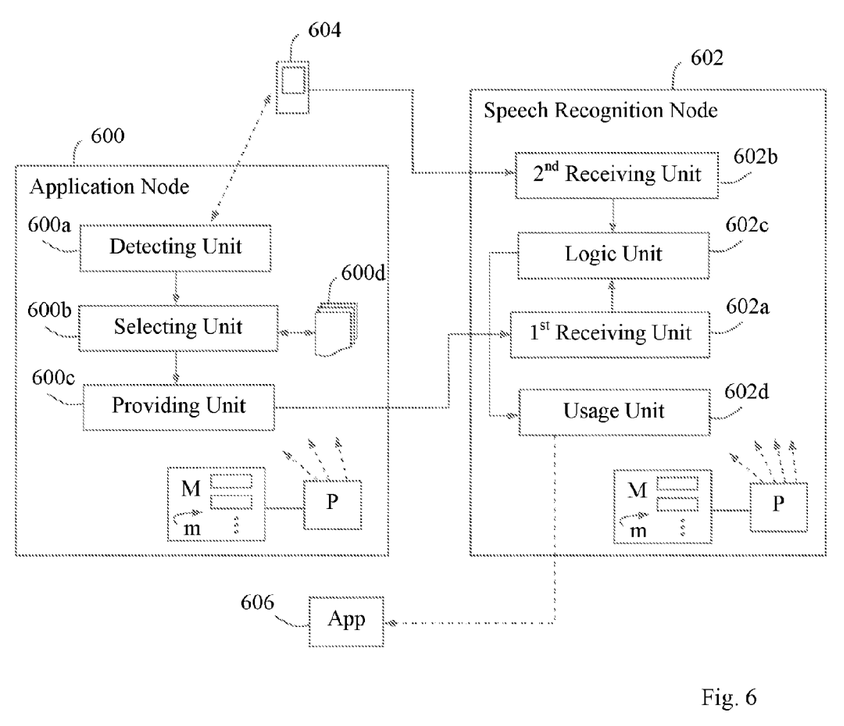
FIG. 6 is a block diagram illustrating an application node and a speech recognition node in more detail, according to further possible embodiments.

A detailed but non-limiting example of how an application node and a speech recognition node can be configured to accomplish the above-described solution, is illustrated by the block diagram in FIG. 6. The application node 600 is configured to enable input from speech, made by a user in a UE 604, to an application 606, while the speech recognition node 602 is configured to produce input to an application from speech made by a user, e.g. according to the procedures described above for any of FIGS. 2-5, respectively.

The application node 600 and the speech recognition node 602 will now be described, one by one, in terms of a possible example of employing the solution. It should be noted that the application node 600 described here could be implemented within the UE 604 used by the user e.g. as shown in FIG. 4, or as a node separate from the UE 604 e.g. as shown in FIG. 2, and the solution is thus not limited in this respect. Although shown as a separate entity in this figure, the application 606 may be implemented together with the application node, and/or in the UE 604, and/or in some other node, not shown.

The application node 600 comprises a detecting unit 600a adapted to detect a current context of the user when the application has been activated, and a selecting unit 600b adapted to select a predefined context 600d that matches the detected current context. It may be assumed that a set of predefined context 600d and associated keywords have already been configured in the application node 600, where at least one valid keyword is associated with each predefined context 600d. It is also possible that just one predefined context 600d and at least one associated keyword have been configured in the application node 600.

The application node 600 also comprises a providing unit 600c adapted to provide at least one keyword associated with the selected predefined context to the speech recognition node 602. Thereby, the speech recognition node 602 is enabled to recognize any of the at least one keyword in the speech made by the user, wherein the recognized keyword is used as input to the application 606, e.g. as a command or the like for controlling the application.

The above application node 600 and its functional units 600a -c may be configured or adapted to operate according to various optional embodiments. In a possible embodiment, the selecting unit 600b may be further adapted to select the predefined context from the set of predefined contexts 204a and associated keywords configured in the application node 600 for the application. As also exemplified above, the predefined contexts 600d may pertain to at least one of: current location of the user, current status of the user, characteristics of the user, identity or role of the user, language spoken by the user, type or current status of the activated application, current time, and current environment of the user.

In another embodiment, the providing unit 600c may be further adapted to provide the at least one keyword associated with the selected predefined context to the user's UE 604, thereby enabling the UE 604 to translate any of the at least one keyword, when occurring in the user's speech, into a command as input to the application 606.

The speech recognition node 602 comprises a first receiving unit 602a adapted to receive from the application node 600 at least one keyword associated with a predefined context that matches a current context of the user, and a second receiving unit 602b adapted to receive the speech made by the user. The speech recognition node 602 also comprises a logic unit 602c adapted to recognize in the received speech a keyword out of the received at least one keyword, and a usage unit 602d adapted to use the recognized keyword as input to the application 606.

The above speech recognition node 602 and its functional units 602a -d may also be configured or adapted to operate according to various optional embodiments. In a possible embodiment, the usage unit 602d may be further adapted to use the recognized keyword by sending the keyword to at least one of the application 606 and the UE 604. Further, the logic unit 602c may be further adapted to recognize the keyword by using any of: speech recognition, keyword spotting and phonetic-based search. The logic unit 602c may also be further adapted to translate the recognized keyword into a command used for controlling the application 606.

It should be noted that FIG. 6 illustrates various functional units in the application node 600 and the speech recognition node 602 in a logical sense, and the skilled person is able to implement these functional units in practice using suitable software and hardware means. Thus, this aspect of the solution is generally not limited to the shown structures of the application node 600 and the speech recognition node 602, and the functional units 600a -c and 602a -d may be configured to operate according to any of the features described in this disclosure, where appropriate.

The functional units 600a -c and 602a -d described above can be implemented in the application node 600 and the speech recognition node 602, respectively, by means of program modules of a respective computer program comprising code means which, when run by processors "P" cause the application node 600 and the speech recognition node 602 to perform the above-described actions. Each processor P may comprise a single Central Processing Unit (CPU), or could comprise two or more processing units. For example, each processor P may include general purpose microprocessors, instruction set processors and/or related chips sets and/or special purpose microprocessors such as Application Specific Integrated Circuits (ASICs). Each processor P may also comprise a storage for caching purposes.

Each computer program may be carried by a computer program product "M" in the application node 600 and the speech recognition node 602, respectively, in the form of a memory having a computer readable medium and being connected to the processor P. Each computer program product M or memory thus comprises a computer readable medium on which the computer program is stored e.g. in the form of computer program modules "m". For example, the memory M may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the application node 600 and the speech recognition node 602, respectively.

By using any of the above-described embodiments of the solution, it is possible to employ speech recognition in a more flexible and efficient way by adapting the choice of valid keywords in dependence of the current context of the user, for use as input to an application. It is an advantage that the solution thus enables dynamic use of keywords in speech input for controlling applications, which is adaptable to different situations. No particular functionality is required in the user's terminal, and no extra efforts are needed from the user either once the predefined contexts and associated keywords have been configured in the application node. Also, the same speech recognition functionality can be used for different applications and for users in different contexts.

While the solution has been described with reference to specific exemplary embodiments, the description is generally only intended to illustrate the inventive concept and should not be taken as limiting the scope of the solution. For example, the terms "application node", "speech recognition node", "keyword", "context", "application" and "context parameter" have been used throughout this description, although any other corresponding entities, functions, and/or parameters could also be used having the features and characteristics described here. The solution is defined by the appended claims.

The invention claimed is:

1. A method performed in an application node for enabling input to an application from speech made by a user, the method comprising:
   detecting a current context of the user when said application has been activated,
   selecting a predefined context that matches the detected current context of the user, wherein said predefined context pertains to status or role of the user, said status or role of the user defining authorizations of the user, and
   providing at least one keyword associated with the selected predefined context to a speech recognition node, thereby enabling the speech recognition node to recognize any of the at least one keyword in said speech, wherein the recognized keyword is used as input to said application.

2. The method according to claim 1, wherein said predefined context is selected from a set of predefined contexts and associated keywords configured in the application node for the application.

3. The method according to claim 1, wherein the at least one keyword associated with the selected predefined context is provided to a user equipment operated by the user, thereby enabling the user equipment to translate any of said at least one keyword, when occurring in said speech, into a command as input to the application.

4. An application node configured to enable input from speech made by a user to an application, the application node comprising:
   a detecting unit adapted to detect a current context of the user when said application has been activated,
   a selecting unit adapted to select a predefined context that matches the detected current context of the user, wherein said predefined context pertains to status or role of the user, said status or role of the user defining authorizations of the user, and
   a providing unit adapted to provide at least one keyword associated with the selected predefined context to a speech recognition node, thereby enabling the speech recognition node to recognize any of the at least one keyword in said speech, wherein the recognized keyword is used as input to said application.

5. The application node according to claim 4, wherein the selecting unit is further adapted to select said predefined context from a set of predefined contexts and associated keywords configured in the application node for the application.

6. The application node according to claim 4, wherein the providing unit is further adapted to provide the at least one keyword associated with the selected predefined context to a user equipment operated by the user, thereby enabling the user equipment to translate any of said at least one keyword, when occurring in said speech, into a command as input to the application.

7. A method performed in a speech recognition node for producing input to an application from speech made by a user, the method comprising:
   receiving from an application node at least one keyword associated with a predefined context that matches a current context of the user, wherein said predefined context pertains to status or role of the user, said status or role of the user defining authorizations of the user,
   receiving said speech made by the user,
   recognizing in the received speech a keyword out of the received at least one keyword, and
   using the recognized keyword as input to said application.

8. The method according to claim 7, wherein the recognized keyword is used by sending the keyword to at least one of the application and a user equipment operated by the user.

9. The method according to claim 7, wherein the keyword is recognized by using any of: speech recognition, keyword spotting and phonetic-based search.

10. The method according to claim 7, wherein the recognized keyword is translated into a command used for controlling the application.

11. The method according to claim 7, wherein the keyword is recognized by using phonetic-based search.

12. A speech recognition node configured to produce input to an application from speech made by a user, the speech recognition node comprising:
   a first receiving unit adapted to receive from an application node at least one keyword associated with a predefined context that matches a current context of the user, wherein said predefined context pertains to status or role of the user, said status or role of the user defining authorizations of the user,
   a second receiving unit adapted to receive said speech made by the user,
   a logic unit adapted to recognize in the received speech a keyword out of the received at least one keyword, and
   a usage unit adapted to use the recognized keyword as input to said application.

13. The speech recognition node according to claim 12, wherein the usage unit is further adapted to use the recognized keyword by sending the keyword to at least one of the application and a user equipment operated by the user.

14. The speech recognition node according to claim 12, wherein the logic unit is further adapted to recognize the keyword by using any of: speech recognition, keyword spotting and phonetic-based search.

15. The speech recognition node according to claim 12, wherein the logic unit is further adapted to translate the recognized keyword into a command used for controlling the application.

16. The speech recognition node according to claim 12, wherein the logic unit is further adapted to recognize the keyword by using phonetic-based search.

* * * * *